United States Patent
Biedermann et al.

(10) Patent No.: US 11,572,161 B2
(45) Date of Patent: Feb. 7, 2023

(54) DUCTED FAN OF AN AIRCRAFT, AND AIRCRAFT

(71) Applicant: Dr. Ing. h.c. F. Porsche Aktiengesellschaft, Stuttgart (DE)

(72) Inventors: Samantha Biedermann, Sachsenheim (DE); Christian Wenzel, Untergruppenbach (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 17/494,878

(22) Filed: Oct. 6, 2021

(65) Prior Publication Data

US 2022/0111953 A1     Apr. 14, 2022

(30) Foreign Application Priority Data

Oct. 14, 2020   (DE) .................... 10 2020 127 029.1

(51) Int. Cl.
    *B64C 27/20*     (2006.01)
    *B64C 11/00*     (2006.01)
    B64C 29/00     (2006.01)

(52) U.S. Cl.
    CPC ............ *B64C 27/20* (2013.01); *B64C 11/001* (2013.01); *B64C 29/0025* (2013.01)

(58) Field of Classification Search
CPC .. B64C 27/20; B64C 11/001; B64C 2201/162
See application file for complete search history.

(56) References Cited

U.S. PATENT DOCUMENTS

| | | | |
|---|---|---|---|
| 2020/0010186 A1 | 1/2020 | Bender et al. | |
| 2020/0010210 A1 | 1/2020 | Warbeck | |
| 2020/0239134 A1 | 7/2020 | Robertson et al. | |
| 2020/0391861 A1* | 12/2020 | Groninga | B64C 11/001 |
| 2021/0009264 A1* | 1/2021 | Chang | B64C 5/06 |
| 2021/0237852 A1 | 8/2021 | Fauri et al. | |
| 2021/0362848 A1* | 11/2021 | Spencer | B64D 17/025 |

(Continued)

FOREIGN PATENT DOCUMENTS

| | | |
|---|---|---|
| DE | 102018116144 A1 | 1/2020 |
| DE | 102018116147 A1 | 1/2020 |

(Continued)

*Primary Examiner* — Tien Q Dinh
*Assistant Examiner* — William L Gmoser
(74) *Attorney, Agent, or Firm* — Leydig, Voit & Mayer, Ltd.

(57) ABSTRACT

A ducted fan of an aircraft includes a rotor-side fan and a stator-side duct that surrounds the rotor-side fan radially at the outside and that defines a flow channel for air flowing via the fan. The stator-side duct has an inner wall facing toward the fan, an outer wall averted from the fan, and at least one stiffening strut that runs within the flow channel. The stiffening strut, at one respective end, extends through the duct and protrudes radially relative to the outer wall of the duct. At the respective end of the stiffening strut, a fastening device is formed. The fastening device is configured to mount the ducted fan on a structural component of the aircraft. The fastening device has an insert composed of a fiber-reinforced plastic and laminated into the respective end of the stiffening strut.

10 Claims, 4 Drawing Sheets

(56) References Cited

U.S. PATENT DOCUMENTS

2021/0394897 A1* 12/2021 Feeley .................... B64C 13/38
2022/0099110 A1*  3/2022 Carr ..................... B64C 29/0033
2022/0111972 A1*  4/2022 Besse .................... B64C 11/001

FOREIGN PATENT DOCUMENTS

| DE | 102018116149 A1 | 1/2020 |
| DE | 102018116153 A1 | 1/2020 |
| DE | 102018116166 A1 | 1/2020 |
| DE | 102018120200 A1 | 2/2020 |
| DE | 102018123470 A1 | 3/2020 |
| EP | 3354566 A1 | 8/2018 |
| EP | 3366582 A1 | 8/2018 |
| EP | 3517428 A1 | 7/2019 |
| JP | 2020040566 A | 3/2020 |
| WO | WO 2020070927 A1 | 4/2020 |

* cited by examiner

DUCTED FAN OF AN AIRCRAFT, AND AIRCRAFT

CROSS REFERENCE TO RELATED APPLICATIONS

This application claims benefit to German Patent Application No. DE 10 2020 127 029.1, filed on Oct. 14, 2020, which is hereby incorporated by reference herein.

FIELD

The disclosure relates to a ducted fan of an aircraft and to an aircraft.

BACKGROUND

DE 10 2018 116 144 A1 discloses an aircraft having a fuselage and having wings which engage on the fuselage. Ducted fans are integrated into the wings. The ducted fans can be covered by slats. The ducted fans may be horizontally or vertically fixed. Horizontally fixed ducted fans serve for the propulsion of the aircraft during a vertical takeoff or a vertical landing. Vertically fixed ducted fans serve for generating forward thrust for the aircraft.

DE 10 2018 123 470 A1 has disclosed an aircraft in the case of which multiple ducted fans are integrated into a wing.

DE 10 2018 116 147 A1 has disclosed a further aircraft. Here, fans which assist the vertical takeoff or a vertical landing of the aircraft engage on a nose of the fuselage of the aircraft.

DE 10 2018 116 153 A1 has disclosed an aircraft in which ducted fans engage on a fuselage, specifically the nose of the fuselage, of the aircraft. Here, two ducted fans are combined to form a unit which is pivotable about an axis of rotation, wherein said axis of rotation runs parallel to a pitch axis of the aircraft.

DE 10 2018 116 166 A1 discloses the basic construction of a ducted fan of an aircraft. According thereto, a ducted fan comprises a rotor-side fan, also referred to as rotor, and a stator-side duct, wherein the duct surrounds the fan radially at the outside. The duct defines a flow channel, extending in an axial direction, for air flowing via the fan.

DE 10 2018 116 149 A1 has disclosed a further ducted fan of an aircraft.

DE 10 2018 120 200 A1 also discloses a ducted fan of an aircraft. In the case of this ducted fan, an electric machine is integrated into the duct.

JP 2020-040566 A has disclosed a further ducted fan such as may be used in drones. This ducted fan has a rotor-side fan and a stator-side duct which surrounds the rotor radially at the outside, wherein stiffening struts for the duct run above and below the duct. By means of several fastening devices that protrude radially outward relative to the duct, the respective ducted fan can be fastened to an adjoining or adjacent structural component of the drone. The fastening of a ducted fan to an adjoining or adjacent structural component as known from JP 2020-040566 A is not suitable for manned aircraft, in the case of which considerably greater forces must be transmitted from the ducted fan into an adjoining or adjacent structural component. There is therefore a demand for a new ducted fan which, on the one hand, can be easily mounted on an adjoining or adjacent structural component of the aircraft and which, on the other hand, is suitable for optimally dissipating forces into the structural component.

SUMMARY

In an embodiment, the present disclosure provides a ducted fan of an aircraft. The ducted fan includes a rotor-side fan and a stator-side duct that surrounds the rotor-side fan radially at the outside and that defines a flow channel for air flowing via the fan. The stator-side duct has an inner wall facing toward the fan, an outer wall averted from the fan, and at least one stiffening strut that runs within the flow channel. The stiffening strut, at one respective end, extends through the duct and protrudes radially relative to the outer wall of the duct. At the respective end of the stiffening strut, a fastening device is formed. The fastening device is configured to mount the ducted fan on a structural component of the aircraft. The fastening device has an insert composed of a fiber-reinforced plastic and laminated into the respective end of the stiffening strut, the insert being configured to receive a bearing seat of a bearing on which the structural component of the aircraft can be mounted.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
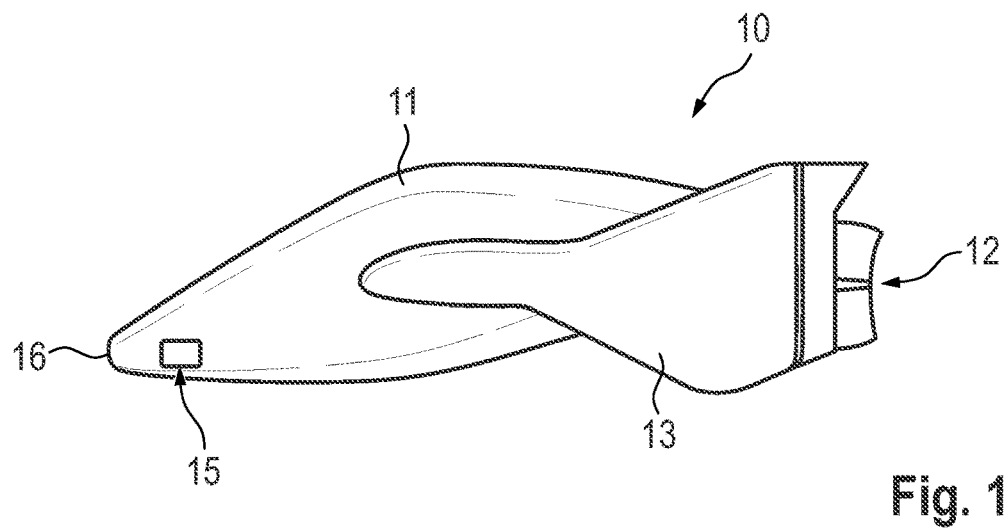
FIG. 1 shows a side view of an aircraft.

The present disclosure provides a new ducted fan of an aircraft and an aircraft having such a ducted fan.

The ducted fan according to the present disclosure has a rotor-side fan and a stator-side duct, which surrounds the fan radially at the outside and defines a flow channel for air flowing via the fan.

The duct of the ducted fan has an inner wall facing toward the fan, an outer wall averted from the fan, and at least one stiffening strut which runs within the flow channel and which, at at least one end, extends through the duct and protrudes radially relative to the outer wall of the duct.

At the respective end by which the respective stiffening struts protrudes radially relative to the outer wall of the duct, there is formed a respective fastening device by means of which the ducted fan can be mounted on an adjoining or adjacent structural component of the aircraft.

The respective fastening device has an insert which is composed of a fiber-reinforced plastic and which is laminated into the respective end of the respective and which receives a bearing seat of a bearing on which the adjoining or adjacent structural component of the aircraft can be mounted.

In the case of the ducted fan according to the present disclosure, an insert which is composed of a fiber-reinforced plastic is laminated into the at least one stiffening strut that extends within the flow channel, defined by the duct, for air flowing via the fan, said insert forming a fastening device for the respective ducted fan, specifically at an end by which the respective stiffening strut extends through the duct and protrudes radially at the outside relative to the outer wall of the duct. In this way, forces can be optimally dissipated from the ducted fan into an adjoining or adjacent structural component.

Preferably, the respective insert has limbs which run in a U shape or V shape with respect to one another and which are connected to one another, wherein the bearing seat is received in a connecting region of the limbs. This is preferred in order to dissipate forces optimally from the ducted fan into the adjoining structural component.

Preferably, on sections of the limbs which are averted from the bearing seat, there are formed multiple steps which successively reduce the cross section of the limbs and which are engaged on in overlapping fashion by complementarily stepped inner layers composed of fiber-reinforced plastic, wherein the cross section of the limbs successively decreases, by way of the steps, in the direction of limb ends applied from the bearing seat. This, too, serves for the optimum dissipation of forces from the ducted fan into the adjoining or adjacent structural component.

Preferably, the respective stiffening strut has a core composed of a foam material, which core engages with a section between the limbs of the respective insert, wherein the core and the insert and the inner layers composed of fiber-reinforced plastic are, at least in certain sections, enwound or encased by outer layers composed of fiber-reinforced plastic. In this way, too, the introduction of force from the ducted fan into the adjoining structural component can be configured to be optimal.

Figure 2:
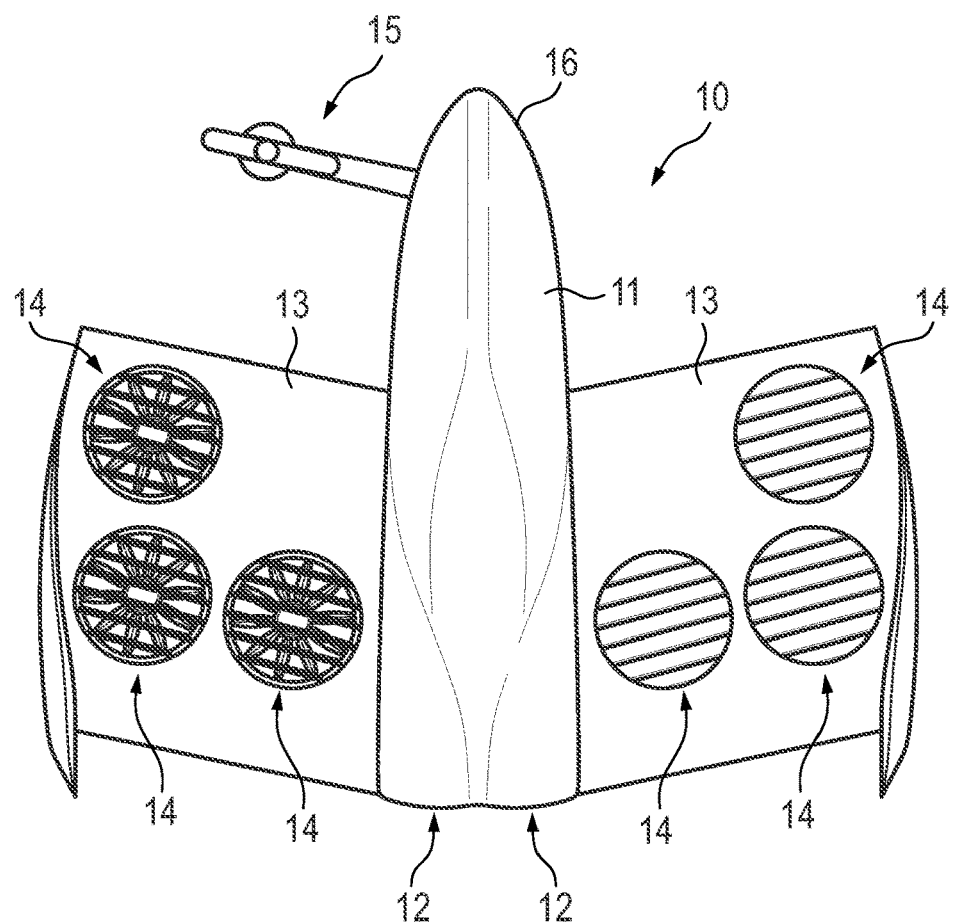
FIG. 2 shows a plan view of the aircraft.

FIGS. 1 and 2 show different views of an aircraft 10. The aircraft 10 has a fuselage 11, which provides, inter alia, a passenger compartment. The aircraft 10 furthermore has wings 13 which engage on the fuselage 11.

The aircraft 10 is a so-called vertical takeoff aircraft which, upon takeoff, lifts off from the ground vertically and, upon landing, lands on the ground vertically.

In order to allow such vertical takeoff and landing of the aircraft 10, the aircraft 10 has in each case at least one wing lift unit 14, also referred to as WLU, at least in the region of each wing 13. In the exemplary embodiment shown, in each case three such wing lift units 14 are provided in each wing 13.

The vertical takeoff and landing of the aircraft 10 that takes place through the use of the wing lift units 14 can be assisted by means of at least one nose lift unit 15 which engages on a nose 16 of the fuselage 11 of the aircraft 10. A nose lift unit 15 is also referred to as NLU.

FIGS. 1 and 2 show a nose lift unit 15 of said type which is positioned on one side of the fuselage 11. It is also possible for two such nose lift units 15 to be used.

The nose lift units 15 are preferably pivotable relative to the fuselage 11, specifically such that the respective nose lift unit 15 is pivoted out of the fuselage 11 for takeoff and landing, whereas the respective nose lift unit 15 is pivoted into the fuselage 11 for flight operation after takeoff and before landing of the aircraft 10.

For the forward thrust of the aircraft 10 after it has taken off, the aircraft 10 has at least one forward thrust unit 12, in the exemplary embodiment shown two forward thrust units 12, which are integrated into the rear end of the fuselage 11.

Each of a respective wing lift unit 14 and a respective nose lift unit 15 and a respective forward thrust unit 12 of the aircraft 10 may comprise a ducted fan 17.

Figure 3:
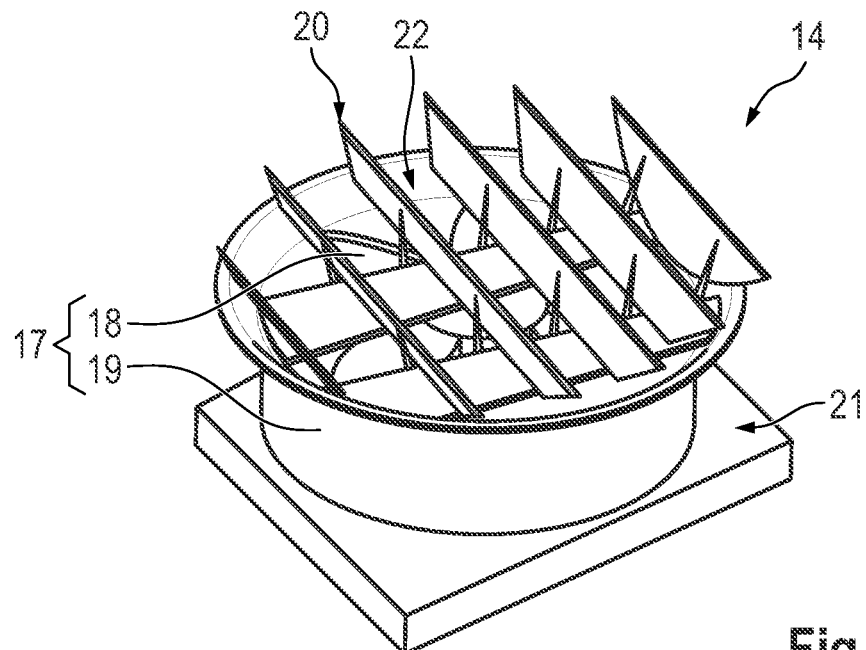
FIG. 3 shows a perspective view of a ducted fan of the aircraft together with slat units.

FIG. 3 shows a perspective view of a wing lift unit 14 that comprises a ducted fan 17. Here, the ducted fan 17 has a rotor-side fan 18 and a stator-side duct 19.

Furthermore, FIG. 3 shows slat units 20, 21, specifically an upper slat unit 20 and a lower slat unit 21, as further assemblies of the wing lift unit 14. For takeoff and landing, the two slat units 20, 21 are opened, and open up a flow channel 22, which is defined by the duct 19 of the ducted fan 17, for a passage of flow.

By contrast, if the wing lift units 14 are not required, in particular during normal flight operation after takeoff and before landing, then the slat units 20, 21 are closed, and close the flow channel 22 of the duct 19 of the respective ducted fan 17.

As already stated, a ducted fan 17 accordingly has the rotor-side fan 18 and the stator-side duct 19.

The stator-side duct 19 defines a flow channel 33 for air flowing via the fan 18, wherein said flow channel 22 extends in the axial direction A of the ducted fan 17. As viewed in the radial direction R of the ducted fan 17, the duct 19 surrounds the rotor or fan 18 radially at the outside.

The duct 19 of the ducted fan 17 has an inner wall 23, which faces toward the fan 18 of the ducted fan 17, and an outer wall 24, which is averted from the fan 18. Both the inner wall 23 and the outer wall 24 are composed in each case of at least one layer composed of fiber-reinforced plastic, preferably composed of a carbon-fiber-reinforced plastic or alternatively of a glass-fiber-reinforced plastic. The inner wall 23 of the duct 19 of the ducted fan 17 defines the flow channel 22 of the ducted fan 17 for the air flowing via the rotor or fan 18.

Preferably, both the inner wall 23 and the outer wall 24 of the duct 19 are formed from multiple layers composed of fiber-reinforced plastic, specifically the inner wall 23 of the duct 19 from a first number of layers and the outer wall 24 from a second number of layers, wherein the first number is preferably greater than the second number. It is then the case that more layers composed of fiber-reinforced plastic are laminated to form a wall in the region of the inner wall 23 than in the region of the outer wall 24. It is possible that, in the region of the inner wall 23, three layers composed of fiber-reinforced plastic, and in the region of the outer wall 24, two layers composed of fiber-reinforced plastic, form the corresponding wall 23, 24.

The layers composed of fiber-reinforced plastic that form the inner wall 23 and the outer wall 24 of the duct 19 of the ducted fan 17 are preferably layers composed of multidirectional fiber-reinforced plastic. The fibers of the fiber-reinforced plastic then run in different directions.

Figure 4:
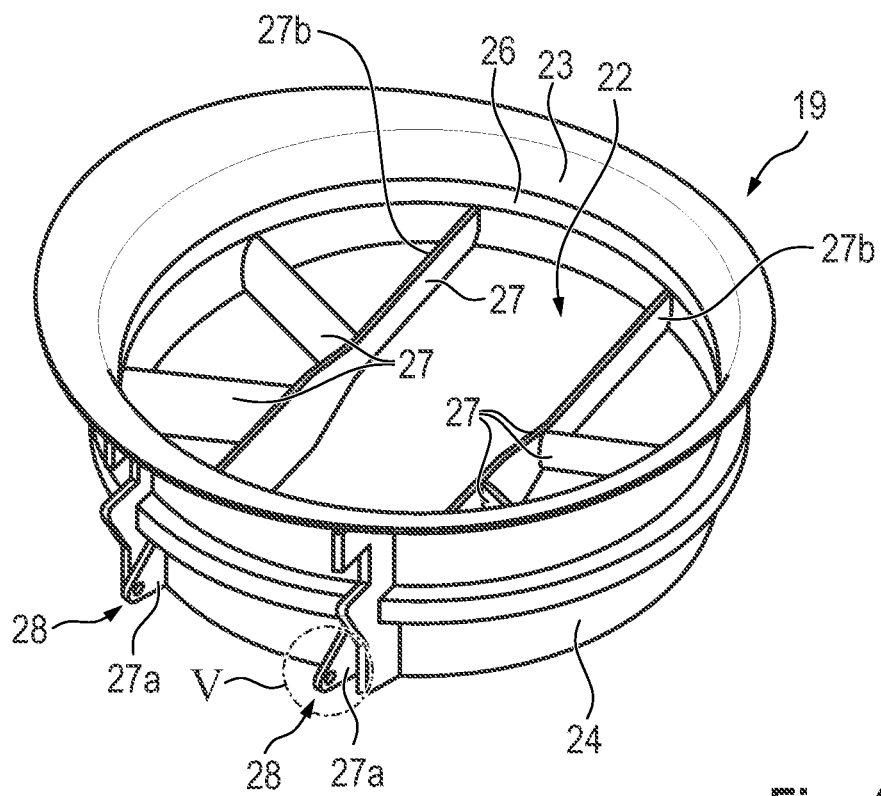
FIG. 4 shows a perspective view of a duct of the ducted fan.
Figure 5:
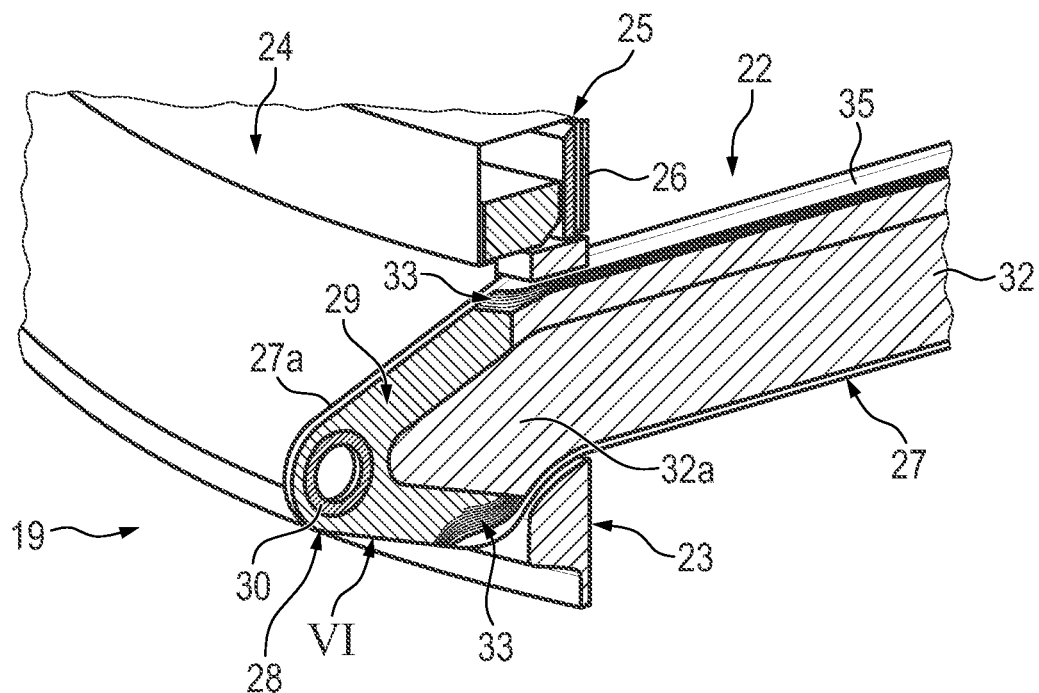
FIG. 5 shows a cross section through the detail V of FIG. 4.

As per FIGS. 4 and 5, the duct 19 of the ducted fan 17 has, at one axial position, a notch 25 which receives a run-in body 26. Said run-in body 26 is preferably a foam body, wherein rotor blades of the rotor or fan 18 of the ducted fan 17 can run into said run-in body 26 during operation, in order that the rotor blades of the rotor or fan 18 are not damaged during operation.

As can be seen from FIG. 4, stiffening struts 27 for the duct 19 extend in certain sections within the flow channel 22 defined by the inner wall 23 of the duct 19 of the ducted fan 17, which stiffening struts have flow-guiding surfaces for the air flowing through the flow channel 22. The flow-guiding surfaces of said stiffening struts 27 are aerodynamically contoured such that the guidance of the air flowing via the fan 18 of the ducted fan 17 is improved in the region of the flow channel 22.

As per FIG. 4, two of these stiffening struts 27 run approximately parallel to one another and each engage with opposite ends 27a, 27b on the duct 19, specifically such that each of said two stiffening struts 27 extends with an end 27a through the duct 19 and protrudes radially at the outside relative to the outer wall 24 of the duct 19. At the end 27b situated opposite the end 27a, said stiffening struts 27 engage on the duct 19 but preferably do not protrude radially at the outside relative to the outer wall 24 of the duct 19. Further stiffening struts 27 extend between the duct 19 and those stiffening struts 27 which extend with one end 27a through the duct 19 and protrude radially at the outside relative to the outer wall 24 of the duct 19.

At the respective end 27a by which the respective stiffening strut 27 protrudes radially relative to the outer wall 24 of the duct, there is formed a respective fastening device 28 by means of which the ducted fan can be mounted on an adjoining or adjacent structural component (not shown) of the aircraft 10. Here, the respective fastening device 28 has an insert 29 which is composed of a fiber-reinforced plastic, for example of a carbon-fiber-reinforced plastic or glass-fiber-reinforced plastic, and which is laminated into the respective end 27a of the respective stiffening strut 27 and which receives a bearing seat 30 of an in particular spherical bearing 31 on which the adjoining or adjacent structural component (not shown) can be mounted.

The respective stiffening strut 27 has a core 32 which is composed of a foam material and which is adjoined in the region of the end 27a by the insert 29, wherein the core 32 composed of the foam material, and the insert 29, are encased or enwound by multiple outer layers 35 composed of fiber-reinforced plastic, wherein said outer layers 35 composed of fiber-reinforced plastic preferably have fibers running in multidirectional fashion. Here, the outer layers 35 composed of fiber-reinforced plastic leave the bearing seat 30 and the bearing 31 free.

The insert 29 composed of the fiber-reinforced plastic has limbs 29a, 29b which run in a U shape or V shape with respect to one another and which are connected to one another, said limbs being connected to one another in a connecting region 29c of the insert 29. Formed or received at said connecting region 29c is the bearing seat 30, which in turn receives the bearing 31.

Figure 6:
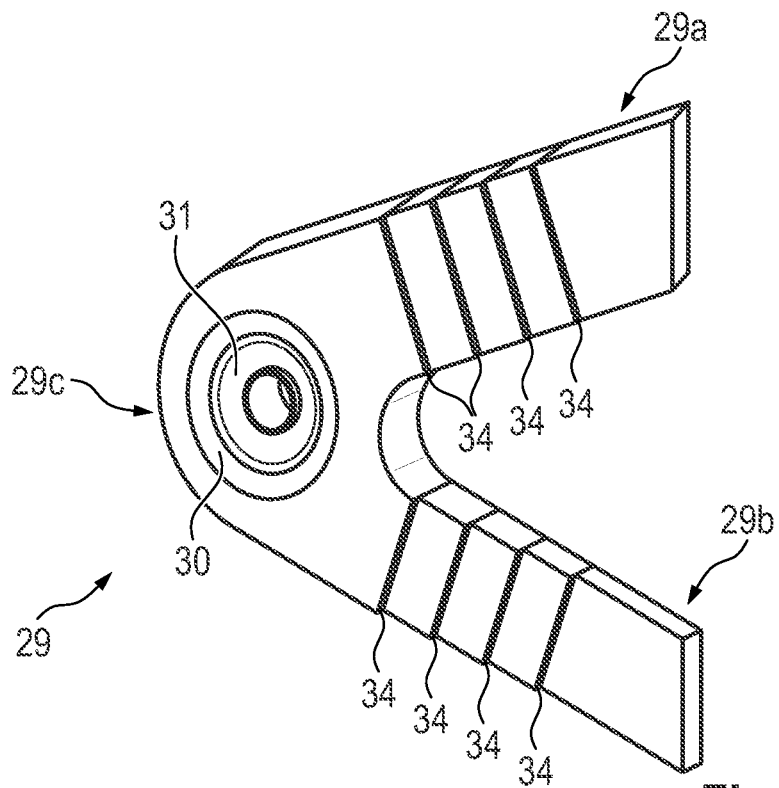
FIG. 6 shows the detail VI of FIG. 5, but in a non-sectional perspective view.
Figure 7:
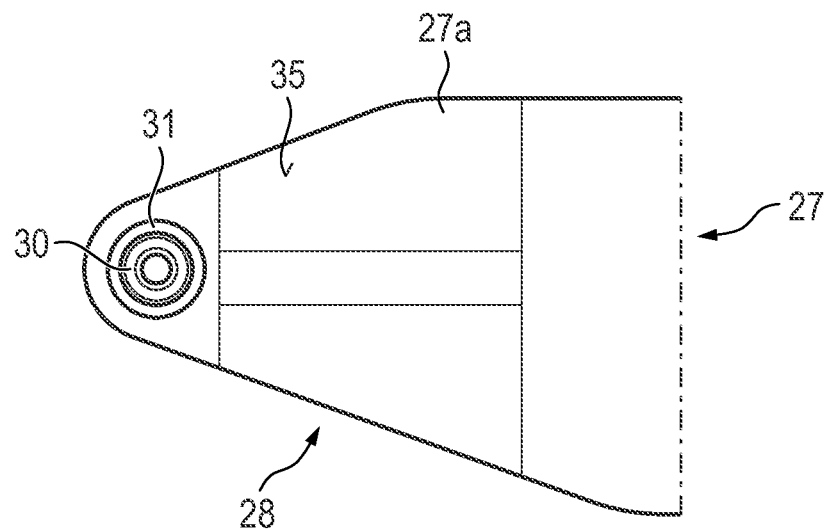
FIG. 7 shows the detail V of FIG. 4.
Figure 8:
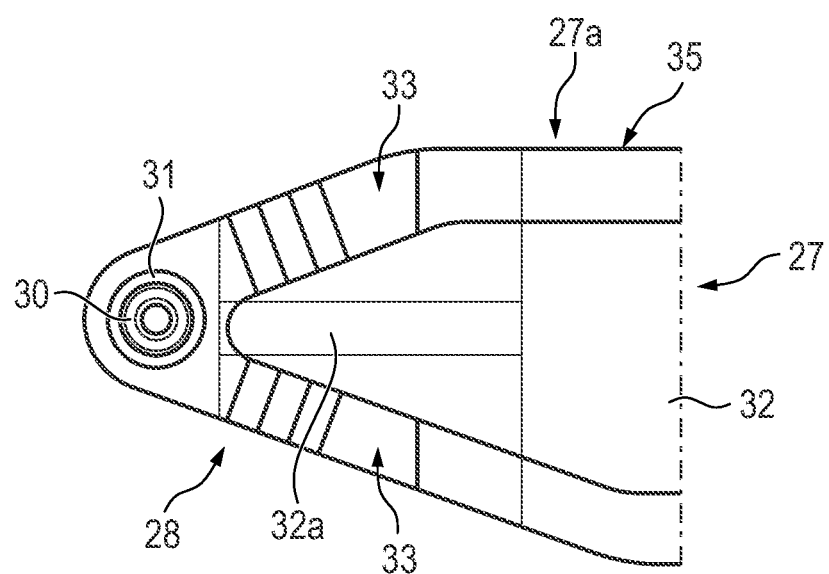
FIG. 8 shows a cross section through FIG. 7.

As can best be seen from FIG. 6, on those sections of the limbs 29a, 29b which are averted from the bearing seat, there are formed multiple steps or shoulders 34 which successively reduce the cross section of the limbs 29a, 29b, wherein said steps or shoulders 34 successively reduce the cross section of the limbs 29a, 29b proceeding from the connecting region 29c in the direction of those limb ends of the limbs 29a, 29b which are averted from the bearing seat 30.

Said steps 34 are engaged on by further, inner layers 33 which are composed of fiber-reinforced plastic and which, in terms of their longitudinal extent in the direction of the connecting region 29c of the respective insert 29, are complementarily stepped in terms of their length and overlap one another. Said layers 33 composed of fiber-reinforced plastic preferably have fibers running in unidirectional fashion, that is to say fibers which all run in the same direction, specifically in the longitudinal direction of the respective stiffening strut 27. The inner layers 33 composed of fiber-reinforced plastic leave the bearing seat 30 and the bearing 31 free. The inner layers 33 composed of fiber-reinforced plastic are encased or enwound by the outer layers 35 composed of fiber-reinforced plastic.

Accordingly, in the case of the ducted fan according to an embodiment of the present disclosure, ends 27a of preferably two stiffening struts 27 that extend within the flow channel 22, defined by the duct 19, for the air flowing via the fan 18 serve directly as an attachment point or bearing point of the ducted fan 17 on an adjoining or adjacent structural component (not shown) of the aircraft 10, specifically ends 27a that protrude radially at the outside in relation to the duct 19. A respective insert 29 composed of a fiber-reinforced plastic is laminated in at said ends 27a of the stiffening struts 27, which insert receives the respective bearing seat 30 of an in particular spherical bearing 31, wherein the bearing seat 30 is preferably of metallic form and adhesively bonded into the respective insert 29.

The carbon-fiber-reinforced plastic or glass-fiber-reinforced plastic insert 29 and the core 32 composed of a foam material of the respective stiffening strut 27 is encased or enwound at least in certain sections by the multiple layers 33, 35 composed of fiber-reinforced plastic, specifically with the bearing seat 30, and the bearing 31 received by the bearing seat 30, being left free.

The core 32 composed of the foam material engages with a section 32a between the limbs 29a, 29b of the respective insert 29.

Forces that act in the region of the ducted fan 17 can be transmitted optimally to an adjoining structural component of the aircraft 10. Furthermore, a weight saving can be realized, because an external bearing arrangement can be omitted.

The present disclosure also relates to the aircraft 10. The aircraft 10 has the above-described fuselage 11 and the wings 13 that engage on the fuselage 11. Furthermore, the aircraft 10 has at least one ducted fan 17.

The ducted fan 17 may engage on the wing 13 as a constituent part of a wing lift unit 14 or on the nose 16 of the fuselage 11 as a constituent part of a nose lift unit 15.

The forward thrust unit 12 may also have a ducted fan 17.

The respective ducted fan 17 is designed as described in detail above.

In particular, the inventive ducted fan 17 engages on a respective wing 13 as a constituent part of a wing lift unit 14.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A ducted fan of an aircraft, comprising:
   a rotor-side fan; and
   a stator-side duct that surrounds the rotor-side fan radially at the outside and that defines a flow channel for air flowing via the fan,
   wherein the stator-side duct has an inner wall facing toward the fan, an outer wall averted from the fan, and at least one stiffening strut that runs within the flow channel and that, at one respective end, extends through the duct and protrudes radially relative to the outer wall of the duct,
   wherein, at the respective end of the stiffening strut, a fastening device is formed, the fastening device being configured to mount the ducted fan on a structural component of the aircraft, and
   wherein the fastening device has an insert composed of a fiber-reinforced plastic and laminated into the respective end of the stiffening strut, the insert being configured to receive a bearing seat of a bearing on which the structural component of the aircraft can be mounted.

2. The ducted fan as claimed in claim 1, wherein the insert has limbs that run in a U shape or V shape with respect to one another and that are connected to one another, wherein the bearing seat is received in a connecting region of the limbs.

3. The ducted fan as claimed in claim 2, wherein, on sections of the limbs which are averted from the bearing seat, multiple steps are formed which successively reduce the cross section of the limbs and which are engaged on in overlapping fashion by complementarily stepped layers composed of fiber-reinforced plastic.

4. The ducted fan as claimed in claim 3, wherein the stepped layers composed of fiber-reinforced plastic have fibers running in unidirectional fashion.

5. The ducted fan as claimed in claim 3, wherein the cross section of the limbs successively decreases, by way of the multiple steps, in a direction of limb ends applied from the bearing seat.

6. The ducted fan as claimed in claim 2, wherein the respective stiffening strut has a core composed of a foam material, which core engages with a section between the limbs of the respective insert, wherein the core and the insert are, at least in certain sections, enwound or encased by layers composed of fiber-reinforced plastic.

7. The ducted fan as claimed in claim 6, wherein the layers composed of fiber-reinforced plastic have fibers running in multidirectional fashion.

8. The ducted fan as claimed in claim 1, wherein two stiffening struts running parallel or approximately parallel extend with, in each case, one end through the duct and protrude radially relative to the outer wall of the duct, wherein in each case one fastening device is formed at said ends.

9. An aircraft, comprising:
   a fuselage that provides a passenger compartment,
   wings that engage on the fuselage, and
   at least one ducted fan as claimed in claim 1, wherein the at least one ducted fan engages on the fuselage or on the wings.

10. The aircraft as claimed in claim 9, wherein the respective ducted fan engages on a structural component of a wing.

* * * * *